United States Patent [19]

Rose et al.

[11] Patent Number: 4,749,150

[45] Date of Patent: Jun. 7, 1988

[54] TURBOFAN DUCT WITH NOISE SUPPRESSION AND BOUNDARY LAYER CONTROL

[75] Inventors: Philip M. Rose, Chula Vista; Alojzy A. Mikolajczak, Coronado, both of Calif.

[73] Assignee: Rohr Industries, Inc., Chula Vista, Calif.

[21] Appl. No.: 813,234

[22] Filed: Dec. 24, 1985

[51] Int. Cl.$^4$ .............................................. B64C 21/06
[52] U.S. Cl. ................................. 244/53 B; 244/1 N; 244/130; 244/209; 181/214
[58] Field of Search .................... 244/1 N, 53 B, 130, 244/208, 209; 60/226.1, 725; 181/203, 206, 213, 214, 222, 256, 258, 262, 292; 415/DIG. 1

[56] References Cited

U.S. PATENT DOCUMENTS

| | | | |
|---|---|---|---|
| 2,853,852 | 9/1958 | Bodine, Jr. | 60/35.6 |
| 2,925,231 | 2/1960 | Pfaff, Jr. et al. | 244/209 |
| 2,932,945 | 4/1960 | Brandt, Jr. | 244/53 B |
| 3,117,751 | 1/1964 | Rogers et al. | 244/209 |
| 3,314,629 | 4/1967 | Rethorst | 244/1 N |
| 3,371,743 | 3/1968 | Chanaud et al. | 181/213 |
| 3,421,577 | 1/1969 | Valyi | 244/208 |
| 3,481,427 | 12/1969 | Dobbs et al. | 181/33 |
| 3,516,895 | 6/1970 | Hartman | 161/68 |
| 3,765,623 | 10/1973 | Donelson et al. | 244/53 B |
| 3,820,628 | 6/1974 | Hanson | 181/33 |
| 3,991,849 | 11/1975 | Green et al. | 244/1 N |
| 4,294,329 | 10/1981 | Rose et al. | 181/222 |
| 4,379,191 | 4/1983 | Beggs et al. | 428/118 |

Primary Examiner—Joseph F. Peters, Jr.
Assistant Examiner—Rodney Corl
Attorney, Agent, or Firm—Patrick J. Schlesinger; Frank D. Gilliam; Michael H. Jester

[57] ABSTRACT

A boundary layer control device is installed in the acoustically treated inlet duct of a turbofan engine. The device sucks off the turbulent boundary layer of air flowing over the inner or "air wetted" surface of the inlet during aircraft take-off, cruise and approach. The lip of the inlet can thus be made thinner to reduce drag during cruise without degradation of fan performance during take-off. The acoustic liner of the inlet comprises a microporous honeycomb sandwich structure through which air may be sucked at various locations through headers and conduits connected to an onboard pump.

10 Claims, 4 Drawing Sheets

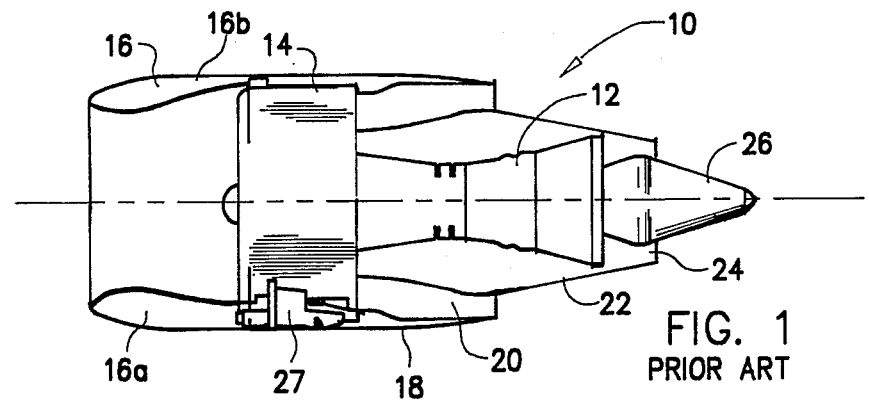
FIG. 1
PRIOR ART
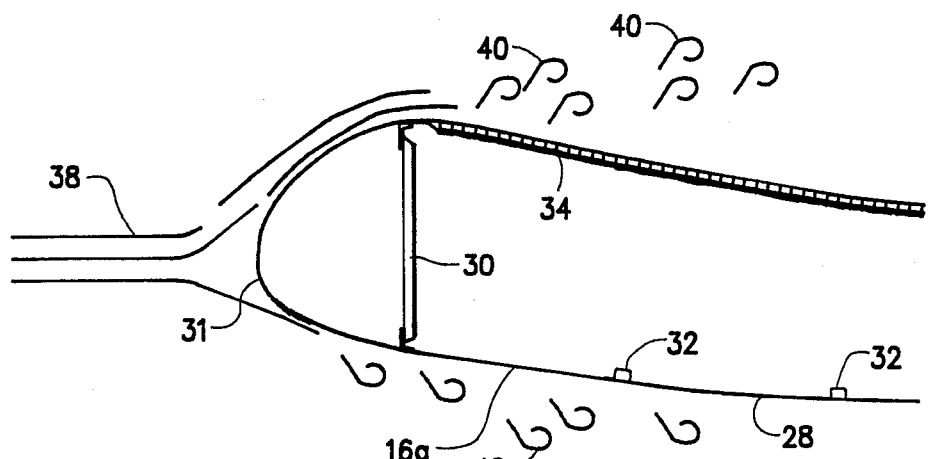
FIG. 2
PRIOR ART
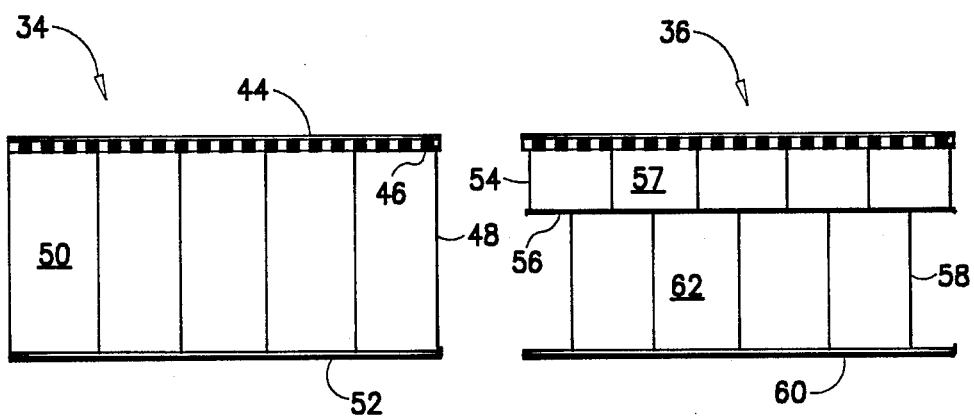
FIG. 3
PRIOR ART
FIG. 4
PRIOR ART

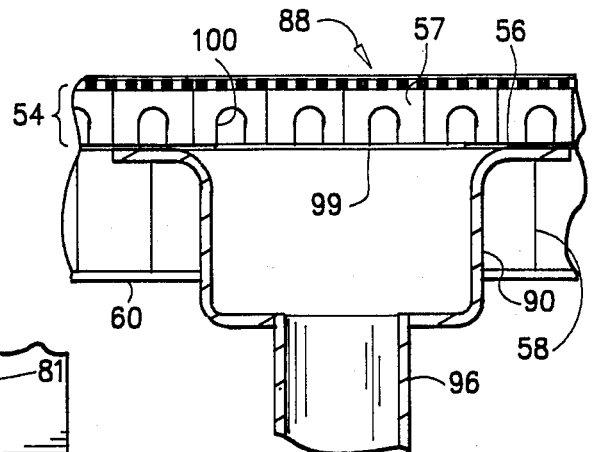
FIG. 6A
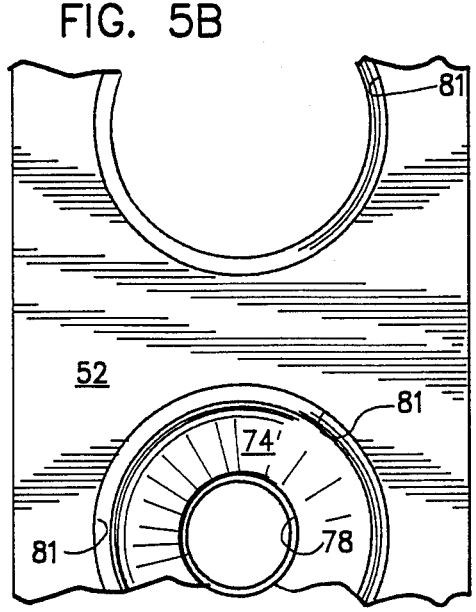
FIG. 5B
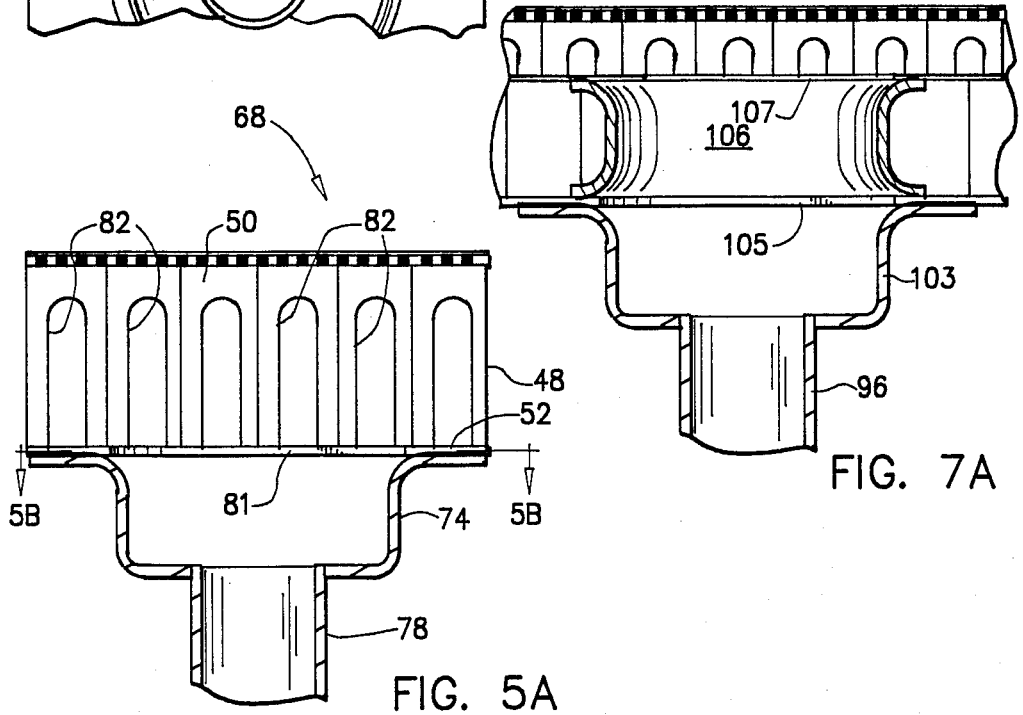
FIG. 7A
FIG. 5A

TURBOFAN DUCT WITH NOISE SUPPRESSION AND BOUNDARY LAYER CONTROL

BACKGROUND OF THE INVENTION

The present invention relates to nacelles associated with turbofan engines mounted to aircraft, and more particularly, to a fan duct of such a nacelle constructed to suppress fan noise and minimize turbulence.

The nacelle for a high bypass ratio turbofan engine used on a transport aircraft performs a number of critical functions. It supports the engine within an outwardly streamlined housing and plays a vital role in determining the efficiency of the engine, both of which affect the overall performance of the aircraft. The gas turbine engine together with the associated nacelle design are also very important in determining the noise footprint of the aircraft in the vicinity of airports. The thrust reverser portion of the nacelle performs the additional task of slowing the aircraft after it touches down on the runway. The nacelle must perform these critical functions under substantial mechanical loads, temperature extremes and vibrational forces with minimum weight and complexity.

In order to meet Governmental noise regulations it is conventional to line the fan inlet and exhaust duct walls of a turbofan nacelle with a noise absorbing material. A honeycomb noise attenuation structure sold under the trademark DynaRohr has been extensively used for this purpose, an example of which is disclosed in U.S. Pat. No. 4,379,191 of Beggs et al. assigned to Rohr Industries, Inc. This structure includes a core having a multiplicity of open cells sandwiched between an outer imperforate facing sheet and an inner perforated sheet with holes that communicate with the cells. A microporous sheet material such as finely woven stainless steel cloth is bonded over the perforated sheet and forms a part of the inwardly exposed surface of the duct. The degree of porosity and the fineness of the microporous sheet, the size and spacing of the holes in the perforated sheet, and the size of the cells in the core are critical to the absorption characteristics, and in particular, to the range of frequencies that can be effectively absorbed.

The air inlet of a turbofan nacelle comprises a large cylindrical inlet duct which is spaced forwardly of the fan. On rotation of the aircraft during take-off, the nacelle inlet is placed in an inclined attitude. The inlet duct has a generally airfoil-shaped cross-section with a relatively thick leading edge portion. This configuration reduces turbulence within the inlet and reduces fan degradation that would lessen engine thrust during the critical take-off period. Unfortunately, the thick leading edge portion of the nacelle inlet is not needed during cruise and it adds significant drag. This drag adversely affects the fuel economy of the aircraft.

In the past, various boundary layer control schemes have been devised for improving laminar flow in aerodynamic applications. For example, slotted and otherwise perforated wings and control surfaces have been provided. During flight a thin boundary layer of turbulent air can be eliminated by sucking it through the slots. See for example U.S. Pat. No. 3,516,895 of Hartman. U.S. Pat. No. 2,853,852 of Bodine, Jr. discloses Helmholtz resonators extending through the wall of a jet engine inlet duct for attenuating aerodynamic-acoustic vibrations within the duct. U.S. Pat. No. 3,820,628 of Hanson discloses boundary layer control for annular flow splitters and radial inlet guide vanes positioned within the inlet duct of a turbine driven fan. The object of the disclosed design is to suppress noise in the inlet duct and to minimize drag and turbulence caused by insertion of such splitters and vanes. The splitters and vanes have slotted surfaces and interior cells designed to form acoustic chambers. The boundary layer of air is sucked through the slotted surfaces, into the chambers and through manifolds formed within the splitters and vanes by a central suction pump connected to the manifolds.

SUMMARY OF THE INVENTION

It is the primary object of the present invention to provide an improved nacelle associated with a turbine engine mounted to an aircraft.

Another object of the present invention is to improve laminar flow of air through the air ducts of a turbofan engine.

Another object of the present invention is to provide a turbofan inlet in which a turbulent boundary layer of air is sucked away from an inner surface of the inlet without significantly impairing the effectiveness of an acoustic liner of the inlet.

Another object of the present invention is to reduce the cross-section of a turbofan inlet to reduce drag during cruise attitude thereof while avoiding turbulence in the inlet during take-off attitude of the inlet which might result in degradation of fan performance.

Another object of the present invention is to improve aircraft performance to allow higher rotation during take-off.

According to the illustrated embodiments of the present invention a boundary layer control device is installed in the acoustically treated inlet duct of a turbofan engine. The device sucks off the turbulent boundary layer of air flowing over the inner or "air wetted" surface of the inlet during aircraft take-off, cruise and approach. The lip of the inlet can thus be made thinner to reduce drag during cruise without degradation of fan performance during take-off. The acoustic liner of the inlet comprises a microporous honeycomb sandwich structure through which air may be sucked at various locations through headers and conduits connected to an onboard pump.

BRIEF DESCRIPTION OF THE DRAWINGS

FIG. 1 is a simplified longitudinal sectional view through a conventional turbofan/nacelle assembly illustrating the operative environment of our invention.

FIG. 2 is a simplified diagrammatic cross-sectional view illustrating the turbulent airflow in an exemplary turbofan inlet duct.

FIGS. 3 and 4 are enlarged diagrammatic sectional views illustrating conventional single and double layer honeycomb noise attenuation sandwich structures used in turbofan inlet ducts.

FIG. 5A is an enlarged cross-sectional view of a portion of the first embodiment illustrating the attachment of suction headers to noise suppressing structure therein.

FIG. 5B is a horizontal sectional view taken along line 5B—5B of FIG. 5A.

FIG. 6A is an enlarged cross-sectional view of a portion of the second embodiment illustrating the attachment of suction headers to noise suppressing structure therein.

FIG. 7A is an enlarged cross-sectional view of a portion of the third embodiment illustrating the attachment of suction headers to noise suppressing structure therein.

DESCRIPTION OF THE PREFERRED EMBODIMENTS

Figure 5:
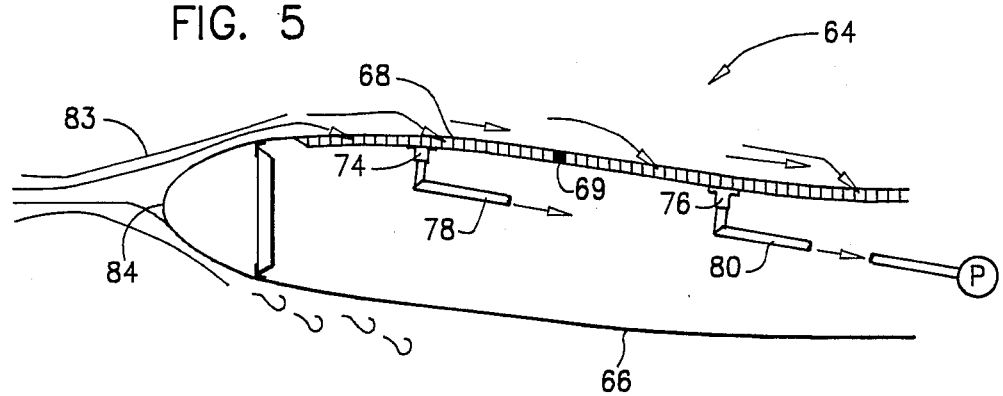
FIG. 5 is a simplified diagrammatic cross-sectional view of a turbofan inlet comprising a first embodiment of our invention.

Referring to FIG. 1, a conventional turbofan/nacelle assembly 10 includes a centrally mounted elongate turbine engine 12 which drives a large fan (not visible) at a forward end of the turbine inside a fan cowl 14. An inlet duct 16 extends forwardly from the fan cowl for directing a large volume of air to the fan and to the inlet (not shown) of the turbine 12. The aft end of the inlet duct has an inside diameter roughly equal to the diameter of the fan. The inlet duct 16 has a lower "fat lip" in the form of a leading edge 16a having a relatively thick cross-section. The upper portion 16b of the inlet duct has an inverted airfoil cross-section at its leading edge. The shape of the inlet duct 16 limits turbulence to avoid degradation of fan performance during the critical take-off period.

Continuing with FIG. 1, a fan reverser 18 extends rearwardly from the fan cowl 14 and defines a fan exhaust duct 20. A core cowl 22 surrounds the aft portion of the turbine engine 12. A primary nozzle 24 for the hot exhaust gases from the turbine engine is defined between the rear end of the core cowl 22 and a center body 26 of the engine. Other engine accessories 27 are also mounted adjacent the fan cowl 14.

The turbofan/nacelle assembly 10 typically has a high bypass ratio that makes it very fuel efficient compared to jet engine assemblies that produce all of their thrust from hot exhaust gases. For example, in a typical modern turbofan/nacelle assembly there may be a five to one ratio between the thrust provided by the large volume of air propelled by the fan and the thrust provided by the hot exhaust gases from the turbine engine. A turbofan/nacelle assembly is also quieter than a jet engine with comparable thrust. In a turbofan/nacelle assembly, air is propelled through the inlet and exhaust ducts around the core turbine engine. The hot exhaust gases are thus surrounded by a jacket of warmer air propelled by the fan. The shear between very hot exhaust gases and cool ambient air is reduced, lessening the jet roar that would otherwise result.

Referring to FIG. 2, the fan inlet duct 16 is defined by a generally cylindrical body 28 made of aluminum alloy, titanium, advanced composite and other suitable metals and materials as is well known to persons skilled in the art. FIG. 2 illustrates the lower fat lip 16a of the inlet duct. The body 28 has a generally airfoil shaped cross-section. A suitable anti-icing means (not shown for ease of illustration) is mounted ahead of a bulkhead 30 within the leading edge portion 31 of the body 28. Internal support ribs 32 also extend within the body 28.

In the particular duct 16 illustrated in FIG. 2, a single layer noise suppressing structure 34 forms a part of the inwardly facing surface of the inlet duct 16. A double layer noise suppressing structure 36 may be substituted in lieu of the single layer noise suppressing structure 34. While a single layer noise suppressing structure is shown in the inlet duct of FIG. 2, it is quite common to find either single or double layer structure used alone in conventional turbofan inlet ducts. Details of the noise suppressing structures 34 and 36 are illustrated in FIGS. 3 and 4, respectively. Further details of the inlet duct 16 have been omitted for the sake of clarity.

During take-off, relatively stable air represented by flow lines 38 strikes the leading edge portion 31 of the inlet duct 16. Due to the inclined angle of attack of the aircraft and the low take-off speed, turbulent boundary layers of air are created adjacent the inner and outer surfaces of the inlet duct, particularly with regard to the fat lip 16a, as illustrated by the swirling lines 40 and 42 respectively. This turbulence creates drag, and if severe enough, can cause significant degradation of fan performance and reduction of thrust. The leading edge portion 31 of the inlet duct is specially configured and made relatively thick to minimize the turbulence inside the inlet duct during the critical take-off period. However the resulting fat lip configuration creates unwanted drag at cruising speed and attitude.

Referring to FIG. 3, the single layer noise suppressing structure 34 may comprise a honeycomb sandwich such as that disclosed in the aforementioned U.S. Pat. No. 4,379,191 of Beggs et al., the entire disclosure of which is specifically incorporated herein by reference. Briefly, an innermost thin sheet of a microporous material 44 such as fine mesh woven stainless steel is adhesively bonded to a perforated facing sheet 46 made of a material such as aluminum alloy. The perforated facing sheet 46 is in turn adhesively bonded to the inner side of a core 48 of a honeycomb material. Cells 50 in the honeycomb core 48 communicate with the air inside the inlet duct 16 through the perforated facing sheet 46 and the microporous sheet 44. An imperforate facing sheet 52 is bonded to the outer side of the honeycomb core 48. The core 48 and the facing sheet 52 may also be made of aluminum alloy. Alternatively, the single layer noise suppressing structure 34 may be made of non-metallic composite materials. The cells are dimensioned and configured to serve as Helmholtz resonators that attenuate the particularly offending sound frequencies. The microporous layer 44 forms the wetted surface of the inlet duct over which the air flows.

Referring to FIG. 4, the double layer noise suppressing structure 36 has a first layer 54 similar to the single layer structure 34 except that an intermediate microporous layer 56 is substituted for the imperforate facing sheet 52. Also, the cells 57 of the first layer 54 of the double layer structure 36 are preferably much shallower than the cells 50 of the single layer structure 34. In addition, the double layer structure has a second layer comprised of a second honeycomb core 58 bonded on its inner side to the intermediate microporous layer 56. The outer side of the second honeycomb core 58 is bonded to an imperforate facing sheet 60. The cells 62 of the second layer are much deeper than the cells 57 of the first layer. The double layer construction of the structure 36 allows it to absorb fan noise over a wider range of frequencies.

Referring to FIG. 5 a first embodiment 64 of our invention comprises an inlet duct for a turbofan engine. It includes a generally cylindrical body having an airfoil or other streamlined cross-section 66. FIG. 5 illustrates a cross-section of the lower portion of the inlet duct. A portion of the inwardly facing surface of the inlet is formed about its entire circumference by a liner 68 of the aforementioned single layer noise suppressing structure 34. Manifold means in the form of a plurality of annular suction headers 74 and 76 are connected via a plurality of respective conduits 78 and 80 to a suitable pump P on board the aircraft. The headers 74 and 76 are coupled to the underside of the liner 68 and are in air flow communication with the cells therein. The liner 68 may be broken into sections by a suitable blocking means 69 in order to insure that the ΔP drawn by conduits 78 and 80 are optimized for each section.

Referring to FIG. 5A, the header such as 74 has an annular channel configuration and is affixed over a series of annularly extending apertures 81 in the imperforate facing sheet 52 of the noise suppressing liner 68. The cells 50 of the honeycomb core 48 each have apertures or slots 82 in the walls thereof for communicating with adjacent cells. As illustrated in FIG. 5B, there are a plurality of headers 74 and 76 mounted in longitudinally spaced locations about the acoustic liner 68.

Referring again to FIG. 5, the first embodiment 64 of our invention operates as follows. During flight, oncoming relatively stable air illustrated by flow lines 83 strikes the leading edge portion 84 of the inlet body 66 and flows past the same. The turbulent boundary layer of air flowing over the inwardly facing surface of the inlet duct is sucked outwardly through the porous noise suppressing liner 68 as illustrated by the arrows in FIG. 5. This substantially reduces the possibility of degradation of the fan performance during ordinary take-off conditions without sacrificing the noise suppression feature of the fan inlet. It also reduces drag during take-off, cruise and approach. Furthermore, while not illustrated by proportional differences between FIGS. 2 and 5, the improved laminar flow resulting from our boundary layer control means allows the cross-section of the fan inlet airfoil to be reduced, thus lessening drag substantially at cruising speeds.

The headers 74 and 76 (FIG. 5) enable the suction to be spread more uniformly over the area of the acoustic liner 68. Further spreading of the suction over the wetted area of the inlet duct represented by the liner 68 is accomplished as a result of the apertures 82 (FIG. 5A) in the cell walls of the honeycomb core 48. They permit air to be drawn between the cells to the closest header.

Figure 6:
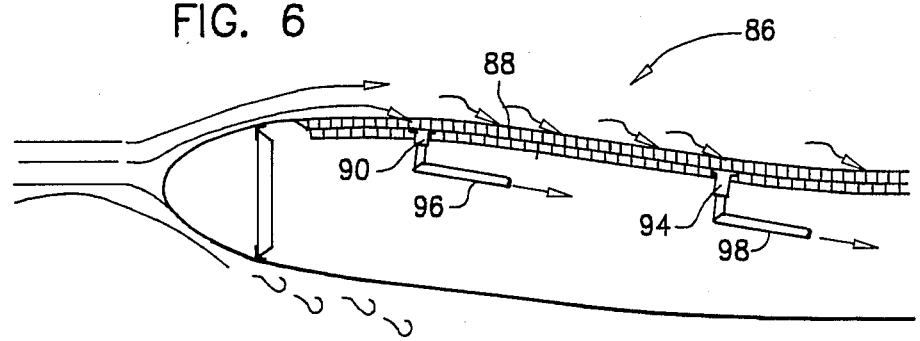
FIG. 6 is a simplified diagrammatic cross-sectional view of a turbofan inlet comprising a second embodiment of our invention.

FIG. 6 illustrates a second embodiment 86 of our invention similar to the first embodiment 64 except for the acoustic liner and header attachments. In the second embodiment the acoustic liner 88 is made of the double layer noise suppressing structure 36. Suction headers 90 and 94 are connected via conduits 96 and 98 to a pump (not shown) for drawing the boundary layer air solely through the innermost first layer 54 (FIG. 6A) of the liner 88. This insures that the sound absorbing properties of the second outermost layer of the liner 88 will be minimally affected by the additional features added by our invention.

Referring still to FIG. 6A, each header such as 90 extends through a corresponding mounting slot in the outermost facing sheet 60 of the double layer acoustic liner 88 and through a slot in the outermost honeycomb core 58. The upper end of the header 90 attaches to the underside of the microporous layer 56 over a plurality of annularly extending holes 99 therein. The walls of the cells 57 of the inner honeycomb core have apertures or slots 100 formed therein for spreading the suction. Again, there are a plurality of headers spaced longitudinally along the acoustic liner 88, similar to FIG. 5B.

In the second embodiment 86 of FIG. 6, the construction of the innermost layer 54 of the noise attenuating liner 88 is optimized for drawing out the boundary layer air. The cell walls of the layer 54 have the apertures or slots 100 to allow free lateral communication throughout this layer. The construction of the outermost layer of the liner 88 is optimized for sound attenuation purposes and may or may not be provided with apertures in its cell walls, depending upon the particular engine application.

Figure 7:
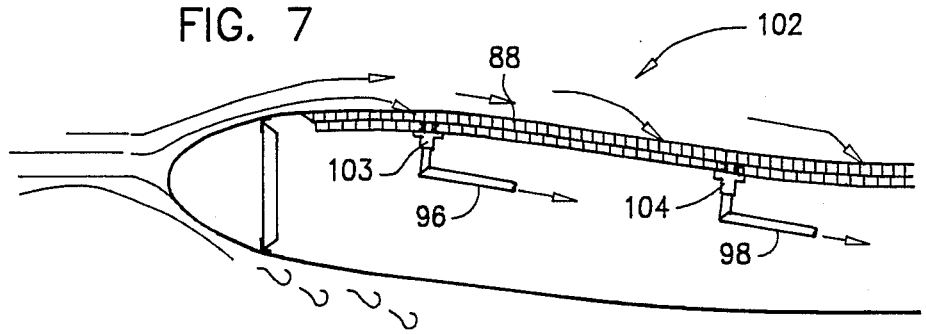
FIG. 7 is a simplified diagrammatic cross-sectional view of a turbofan inlet comprising a third embodiment of our invention.

Referring to FIG. 7, a third embodiment 102 of our invention is similar to the second embodiment 86 except for the attachment of the headers. In the third embodiment, a plurality of longitudinally spaced annular headers 103 and 104 suck air through the acoustic liner 88. As illustrated in FIG. 7A, each channel shaped header, such as 103, is attached to the outermost facing sheet of the double layer liner 88, over a plurality of spaced annularly extending holes 105 therein. A cylindrical sleeve or plenum 106 fits within a bore in the outermost honeycomb core in alignment with each hole 105 in the outermost facing sheet. The upper end of the sleeve 106 is attached to the intermediate microporous sheet 56, over a hole 107 therein. Again, there are a plurality of longitudinally spaced headers similar to FIG. 5B.

Figure 8:
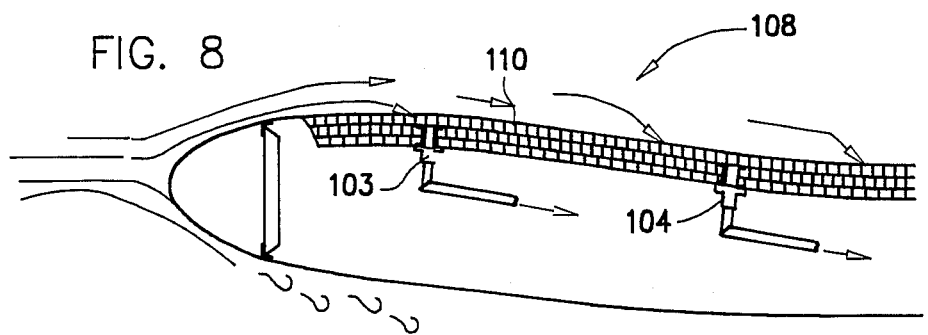
FIG. 8 is a simplified diagrammatic cross-sectional view of a turbofan inlet comprising a fourth embodiment of our invention.
Figure 8A:
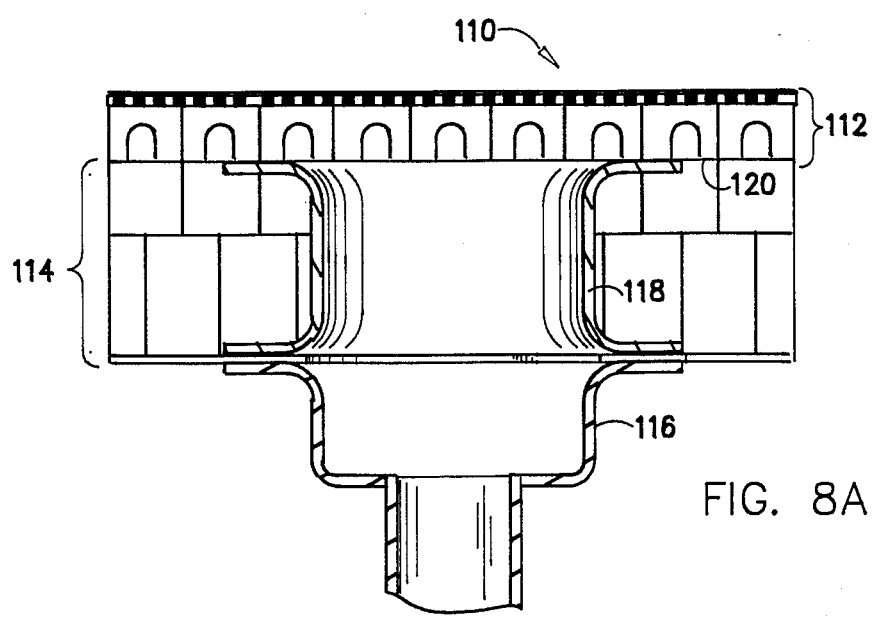
FIG. 8A is an enlarged cross-sectional view of a portion of the fourth embodiment illustrating the attachment of suction headers to noise suppressing structure therein.

FIGS. 8 and 8A illustrate a fourth embodiment 108. It has an acoustic liner 110 with an innermost section 112 of single layer structure similar to the structure 34 of FIG. 3 and an outermost section 114 of a double layer structure similar to the structure 36 of FIG. 4. Channel shaped headers 116 are connected to the outer side of the section 114 and communicate with a plurality of spaced annularly extending sleeves 118 that extend all the way through the section 114. The upper ends of the sleeves 118 are attached to a microporous sheet 120 of the section 114 over corresponding apertures therethrough. The construction of the innermost section 112 is optimized for laminar flow control while the construction of the outermost section 114 is optimized for sound attenuation to suit the parameters of the particular engine utilized with the inlet.

Figure 9:
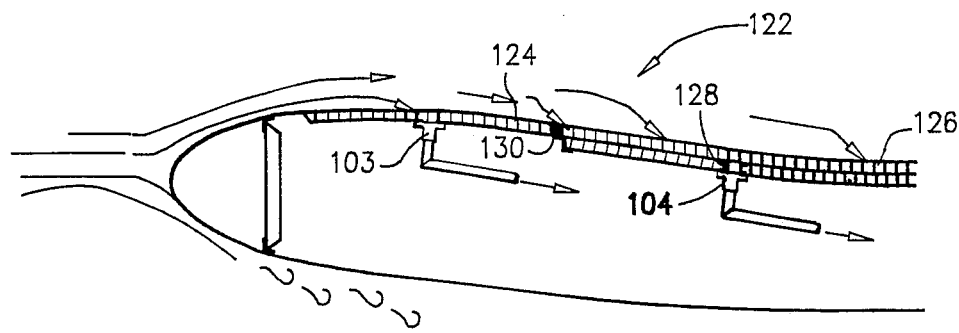
FIG. 9 is a simplified diagrammatic cross-sectional view of a turbofan inlet comprising a fifth embodiment of our invention. Throughout the drawing figures, dimensions and relative proportions are not to scale.

FIG. 9 illustrates a fifth embodiment 122 of our invention in which the inwardly facing surface of the inlet duct is partially formed of a forward circumferential acoustic liner 124 and a rearward acoustic liner 126. The forward liner is made of the single layer noise suppressing structure 34 and the rearward liner is made of the double layer noise suppressing structure 36. Boundary layer air is sucked completely through the forward liner 124, but only through the innermost layer of the rearward liner 126 as a result of sleeves 128. The fifth embodiment is thus a hybrid of the first and third embodiments 64 (FIG. 5) and 102 (FIG. 7). An airtight seal 130 separates the adjoining edges of the single and double layer liners 124 and 126.

While we have described the fundamental features of our invention along with several representative embodiments thereof, it should be understood that these embodiments may be modified in arrangement and detail by those skilled in the art without departing from the spirit of our invention. By way of example, and without limitation, such modifications might include different noise suppressing structures, manifolds and connection schemes. The innermost microporous layer may be modified to lessen airflow resistance. The inlet duct may only have air sucked from a longitudinal and/or circumferential sector of its liner. Other portions of the turbofan nacelle may be provided with similar laminar flow improving means such as the fan exhaust duct 20 (FIG. 1). Instead of a power driven pump some sort of Venturi or other low pressure vent system may provide adequate suction. Therefore, the protection afforded our invention should only be limited in accordance with the scope of the following claims and reasonable equivalents thereof.

We claim:

1. An inlet duct for a high bypass ratio turbofan engine which produces thrust in the form of hot gases exhausted by a turbine and relatively cool air propelled by a fan driven by the turbine at a forward end thereof, the inlet duct including a generally cylindrical body having an inside diameter corresponding to a diameter of the fan, the body having a cellular noise suppressing structure forming a part of an inwardly facing surface of the body, the noise suppressing structure having a construction that absorbs fan noise over a wide range of frequencies and including an innermost thin sheet of a microporous material, and means for sucking off through at least a portion of the noise suppressing structure a sufficient amount of a turbulent boundary layer of air flowing past the inwardly facing surface to permit a substantially reduced cross-section of the body so that degradation of the performance of the fan during a take-off attitude of the inlet duct will be minimized and aerodynamic drag of the inlet duct during a cruise attitude will be substantially reduced.

2. An inlet duct according to claim 1 wherein the sucking means includes manifold means connected to the noise suppressing structure for drawing air through the noise suppressing structure.

3. An inlet duct according to claim 2 wherein the manifold means is operatively connected to the noise suppressing structure at a plurality of discrete locations spaced circumferentially about the cylindrical body.

4. An inlet duct according to claim 2 wherein the manifold means includes a plurality of longitudinally spaced headers.

5. In a nacelle for an engine which produces thrust in the form of hot gases exhausted by a turbine and relatively cool air propelled by a fan driven by the turbine at a forward end thereof, an inlet duct for directing air to the fan, the inlet duct having a porous noise suppressing structure forming a part of an inwardly facing surface of the inlet duct and means for sucking off at least a part of a turbulent boundary layer of air flowing past the inwardly facing surface to thereby enhance laminar flow of air to the fan;

the noise suppressing structure including an innermost thin sheet of a microporous material bonded to a perforated facing sheet which is in turn bonded to an inner side of a first sheet of honeycomb having cells which communicate with the air inside the duct through the perforated facing sheet and through the innermost sheet of microporous material, the noise suppressing structure further including an intermediate thin sheet of the microporous material bonded on an inner side thereof to an outer side of the first sheet of honeycomb material, and a second sheet of the honeycomb material bonded to an outer side of the intermediate sheet of microporous material, the second sheet of honeycomb material having cells which communicate with the air inside the duct through the innermost and intermediate sheets of microporous material, the cells of the first sheet of honeycomb material and the perforated facing sheet;

the noise suppressing structure further including a second facing sheet bonded to an outer side of the second sheet of honeycomb material, the second facing sheet having a plurality of holes formed therethrough, the sucking means including a plurality of headers connected to an outer side of the second facing sheet and communicating with the cells of the second sheet of honeycomb material through the holes in the second facing sheet, and the sucking means further including a plurality of sleeves extending through the second sheet of honeycomb material and communicating with the headers so that air can be drawn through the innermost sheet of microporous material, through the perforated facing sheet, through the cells of the first sheet of honeycomb material, through the sleeves, and through the headers.

6. The combination of claim 5 wherein the noise suppressing structure further includes a third sheet of honeycomb material bonded on an outer side thereof to an innermost side of the innermost sheet of microporous material, and a third sheet of microporous material bonded to an inner side of the third sheet of honeycomb material.

7. In a nacelle for a engine which produces thrust in the form of hot gases exhausted by a turbine and relatively cool air propelled by a fan driven by the turbine at a forward end thereof, an inlet duct for directing air to the fan, the inlet duct having porous noise supressing structure forming a part of an inwardly facing surface of the inlet duct and means for sucking off at least a part of a turbulent boundary layer of air flowing part the inwardly facing surface to thereby enhance laminar flow of air to the fan;

the noise suppressing structure including an inner layer of a first honeycomb material bonded in overlapping relationship to an outer layer of a second honeycomb material, the first and second honeycomb materials each having walls defining a plurality of cells, the cells of the first honeycomb material having a different size than the cells of the second honeycomb material, and the walls defining the cells of the inner layer of the first honeycomb material having apertures to permit air to flow therebetween; and the sucking means including means extending through the outer layer of the noise suppressing structure for drawing air solely through the cells of the first honeycomb material.

8. The combination of claim 7 wherein the noise suppressing structure further includes a layer of a microporous material overlying an inner side of the inner layer of the first honeycomb material and forming a part of the inwardly facing surface of the inlet duct.

9. The combination of claim 8 wherein the noise suppressing structure further includes a second layer of a second microporous material bonded between the inner and outer honeycomb layers.

10. A nacelle for a turbofan engine, comprising:
a generally cylindrical body for surrounding the engine, including an inlet duct for directing air to a fan of the engine;
the inlet duct having a thin cross-section for minimizing drag during cruising speeds;
a noise suppressing structure forming at least a part of an inwardly facing surface of the inlet duct, the noise suppressing structure having an inner honeycomb sheet with walls defining a plurality of cells communicating with the air inside the duct, the walls having apertures to permit air to be drawn between the cells, and an outer honeycomb sheet bonded in overlapping relationship with the inner honeycomb sheet, the outer honeycomb sheet having walls defining a plurality of cells, the cells of the inner and outer honeycomb sheets having different sizes; and
means for improving laminar flow of air past the inwardly facing surface of the duct, including means extending through the outer honeycomb sheet for drawing air through the cells of the inner honeycomb sheet but not through the cells of the outer honeycomb sheet.

* * * * *